United States Patent [19]
Ueda

[11] Patent Number: 6,152,712
[45] Date of Patent: Nov. 28, 2000

[54] SCROLL THRUST BEARING

[75] Inventor: Koichi Ueda, Nara, Japan

[73] Assignee: Koyo Machine Industries Co., Ltd., Osaka, Japan

[21] Appl. No.: 09/359,442

[22] Filed: Jul. 22, 1999

[30] Foreign Application Priority Data

Jul. 24, 1998 [JP] Japan .................................. 10-225307

[51] Int. Cl.⁷ ..................................................... F01C 1/02
[52] U.S. Cl. ........................................ 418/55.1; 418/55.3
[58] Field of Search .................... 418/55.1, 55.3

[56] References Cited

U.S. PATENT DOCUMENTS

| | | | |
|---|---|---|---|
| 4,259,043 | 3/1981 | Hidden et al. | 418/55.1 |
| 4,468,181 | 8/1984 | Sakamoto | 418/55.3 |
| 4,715,733 | 12/1987 | Rood | 418/55.1 |
| 5,366,297 | 11/1994 | Wolverton et al. | 384/9 |
| 5,758,978 | 6/1998 | Satoda et al. | 418/55.3 |
| 5,846,000 | 12/1998 | Tanishiki | 418/55.1 |

FOREIGN PATENT DOCUMENTS

| | | | |
|---|---|---|---|
| 5141412 | 6/1993 | Japan | 418/55.1 |
| 9004639 | 1/1997 | Japan | 418/55.1 |

*Primary Examiner*—Thomas Denion
*Assistant Examiner*—Theresa Trieu
*Attorney, Agent, or Firm*—Arent Fox Kitner Plotkin & Khan PLLC

[57] ABSTRACT

A roller bearing of high precision structure at a far lower cost as compared with the prior art, having double tapered rollers as rolling elements. It comprises a fixed side bearing plate, a swivel side bearing plate, plural double tapered rollers disposed between both bearing plates so as to swivel and roll between them for supporting the axial load from both bearing plates, a holding plate for positioning and holding the double tapered rollers rotatably in a specified configuration, and a revolution arrester for preventing relative rotation of both bearing plates. While preventing relative rotation of the both bearing plates by the revolution arrester, the double tapered rollers are allows to roll and move on the bearing plates, so that relative and smooth swivel of both bearing plates may be assured.

20 Claims, 11 Drawing Sheets

SCROLL THRUST BEARING

BACKGROUND OF THE INVENTION

1. Field of the Invention

The present invention relates to a scroll thrust bearing, and more particularly to a thrust bearing having plural double tapered rollers as rolling elements preferably used for axial load support structure in, for example, scroll type compressor.

2. Description of the Related Art

A scroll type compressor is a kind of rotary compressor, in which compression of fluid is continuous, and torque fluctuations and vibrations are smaller as compared with the conventional reciprocating compressor and high speed operation is possible, and hence it is intensively developed recently.

This kind of compressor comprises a axial load support structure for enabling its scroll drive. This support structure is a so-called built-in type, being integrally assembled in the compressor, and a kind of thrust bearing is composed, and a bearing called a ball coupling for use in such position has been already known as an independent mechanical element.

Anyway, steel balls or similar spheres are used as rolling elements, but such spheres support in point contact state, and are hence small in load capacity and inferior in durability, not withstanding long-term use in high speed and high load condition, and there were problems in the service life. In addition, assembling was difficult because each sphere must be incorporated when assembling the compressor.

Figure 10A:
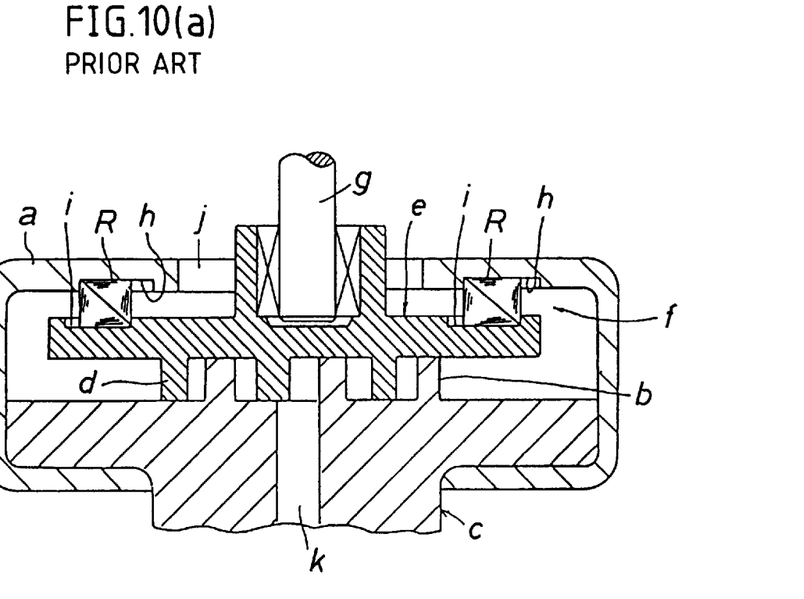
FIG. 10(a) is a sectional view showing the axial load support structure having conventional double tapered rollers in a scroll type compressor.

To solve such problems, a scroll type compressor comprising a axial load support structure is proposed as shown in FIG. 10(a) (for example, Japanese Laid-open Utility Model No. 61-82086, Japanese Laid-open Patent No. 62-107284).

In the scroll constitution of this compressor, as shown in the diagram, a fixed scroll member (c) having a volute (b) is fixed in a housing (a), and a swivel scroll member (e) having a volute (d) to be engaged with the volume (b) is supported on a axial load support structure (f) so as to be free to swivel or revolve, while this swivel scroll member (e) is driven as being coupled to a drive source not shown in the drawing through a crankpin (g).

The support structure (f) is formed as a kind of thrust bearing, and plural pockets (h), (i) are disposed oppositely at the inner side of the housing (a) and the facing side of the swivel scroll member (e), while double conical rolling elements R (double tapered rollers) are interposed between the both pockets (h) and (i) so as to roll between them.

By the rotary drive of the crankpin (g), the swivel scroll member (e) swivels or rotates without revolving on the fixed scroll member (c), and the fluid gas sucked in from a suction port (j) is compressed in a compression chamber formed between the volutes (b) and (d), and is discharged through a discharge port (k).

Figure 10B:
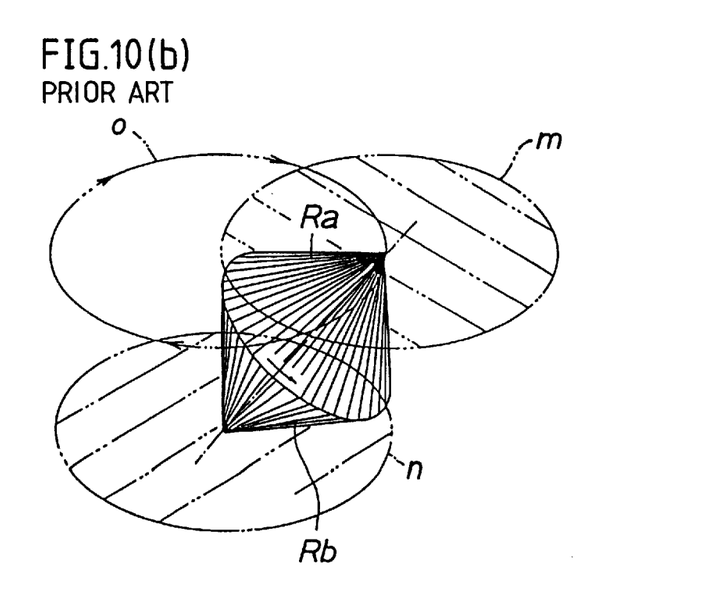
FIG. 10(b) is a schematic perspective view of swivel rolling state of the double tapered roller.

In this case, as shown schematically in FIG. 10(b), the double tapered rollers R captured in the pockets (h), (i) make rolling motions while their conical surfaces Ra, Rb are in a linear contact state with flat bottoms (m), (n) of the pockets (h), (i). These double tapered rollers R, R, . . . arrest relative rotation of both scroll members (c), (e) (revolution of the swivel scroll member (e)) when the swivel scroll member (e) swivels on the fixed scroll member (c) (this swivel route coincides with the route indicated by arrow (o) in FIG. 10(b)).

A roller bearing preferably used as such axial load support structure (f) has been also proposed (for example, Japanese Laid-open Patent No. 62-274113, and Japanese Laid-open Patent No. 7-119741).

Figure 11A:
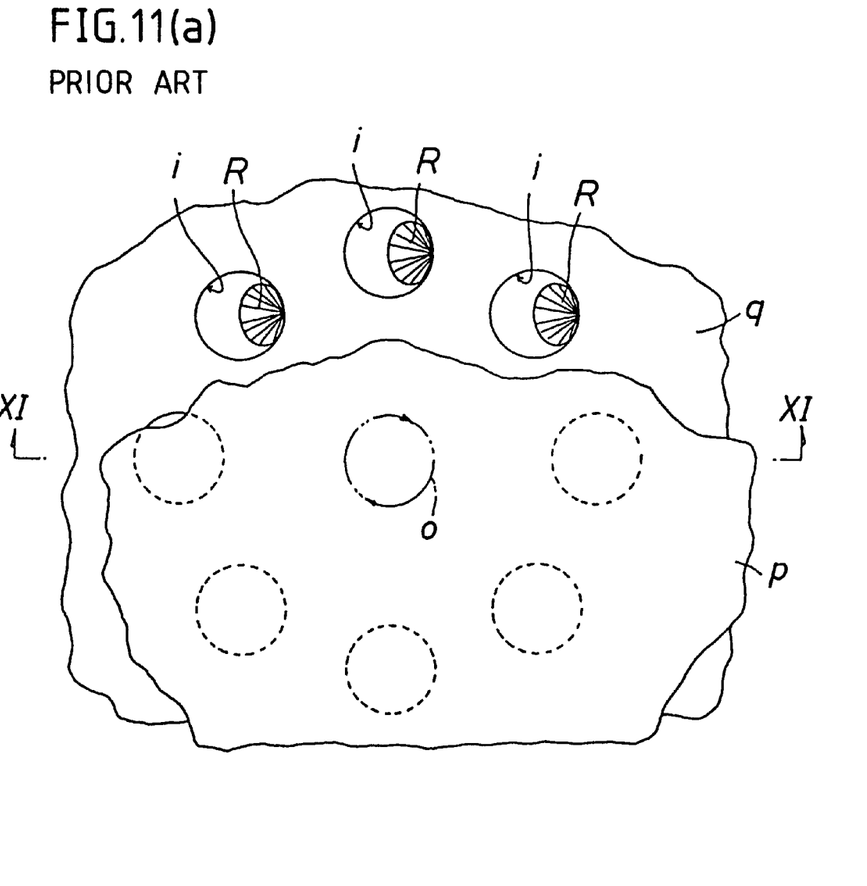
FIG. 11(a) is a pan view of a conventional scroll thrust bearing applicable to the same scroll type compressor.
Figure 11B:
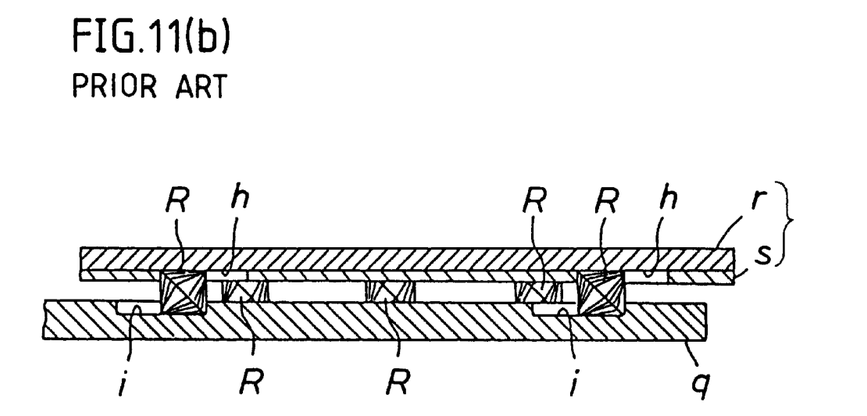
FIG. 11(b) is a sectional view along line XI—XI in FIG. 11(a) showing the conventional scroll thrust bearing.

This roller bearing is shown in FIG. 11(a) and FIG. 11(b), in which a plurality of double tapered rollers R, R, . . . are interposed between a pair of parallel bearing plates (p) and (q) so as to roll between them. The double tapered rollers R are held in a pair of pockets (h), (i) provided oppositely in the bearing plates (p), (q). These pockets (h), (i) are circular in shape having an inside diameter corresponding to the relative swivel route (o) of the both bearing plats (p), (q), and either like the pocket (h) of the bearing plate (p), a track plate (r) having a track forming surface and a holding plate (s) having a pocket forming hole are integrally laminated and fixed, or like the pocket (i) of the bearing plate (q), it is directly formed on a single bearing plate (q).

In the pockets (h), (i), the double tapered rollers R make rolling motions as shown in FIG. 10(b), so as to guarantee relative and smooth swivel of the both bearing plates (p), (q), while arresting relative rotation of the both bearing plates (p), (q).

According to such double tapered rollers R, R, . . . or the axial load support structure (f) using roller bearings, as compared with the conventional constitution using rolling elements composed of spheres, the durability is improved outstandingly, and it sufficiently withstands long-term use in high speed and high load condition.

In spite of such excellent durability, however, in the scroll type compressor having such axial load support structure (f) is not realized yet at the present because the assembling and manufacturing technology of the axial mass-produce at low cost and high precision, and it is far from the practical level.

SUMMARY OF THE INVENTION

It is hence a primary object of the invention to present a novel scroll thrust bearing solving such problems of the prior arts.

It is other object of the invention to present a roller bearing of high precision structure at a far lower cost as compared with the prior art, by using double tapered rollers as rolling elements.

The scroll thrust bearing of the invention is a thrust bearing interposed between parts making relative scroll motions, comprising a fixed side bearing plate disposed at the fixed side, a swivel side bearing plate disposed at the swivel side, plural double tapered rollers disposed so as to roll between the two bearing plates for supporting the axial load from both bearing plates, a holder for positioning and holding these double tapered rollers rotatably in a specific configuration, and a revolution arrester for preventing relative rotation of the both bearing plates.

Herein, the double tapered roller is a conical element having a pair of conical outer circumferences matched coaxially and coupled together at the bottoms.

The layout of the double tapered conical rollers load support structure (f) is not established completely.

That is, the scroll swivel radius in the scroll constitution of the compressor, that is, the radius of swivel route (o) in the axial load support structure (f) is equal to the generatrix length of the conical surfaces Ra, Rb of the double tapered roller R, and the shape and dimension of the double tapered roller R itself are very small structurally. Moreover, in the axial load support structure (f) of the scroll swivel unit shown in FIG. 10(a), or the constitution of the roller bearing shown in FIG. 11(a) or FIG. 11(b), the relative dimensional precision of high level and a higher assembling precision are demanded between constituent elements. On this other hand, in this kind of axial load support structure (f) or roller bearing, mass producibility is required as mechanical elements.

In such structure, however, in the assembling process of the scroll structure, assembling process of the roller bearing, or incorporating process into the scroll structure, layout or position of the double tapered rollers R, R, . . . may be disturbed only by a slight vibration. It is hence extremely difficult to incorporate all double tapered rollers R, R, . . . neatly onto the track, and the structure for mass production by automatic assembling is not established so far, and it is practically impossible to includes the single row layout having double tapered rollers disposed in one row at specific intervals in the circumferential direction between both bearing plates, and the dual row layout having double tapered rollers disposed in two rows at specific intervals in the circumferential direction.

In the scroll thrust bearing of the invention, by the revolution arrester, relative rotation of the pair of bearing plates is blocked, while relative and smooth swivel of the pair of bearing plates is guaranteed by the rolling motion of the double tapered rollers on the bearing plates.

For example, when the scroll thrust bearing of the invention is used as the thrust bearing for a scroll type compressor, the fixed side bearing plate is integrally disposed at the fixed side, and the swivel side bearing plate is integrally disposed on the swivel scroll member, and this swivel scroll member is coupled to the rotary drive source through a crankpin.

When the swivel scroll member is moved to swivel through the crankpin by the rotary drive source, the swivel scroll member swivels or rotates on the fixed scroll member, without revolving by the action of the revolution arrester, so that specified compression process is conducted.

In this case, the axial load occurring between the fixed bearing plates is supported by plural tapered rollers disposed between the both bearing plates, and these tapered rollers make rolling motions with their conical surfaces in linear contact state with the track surface of the both bearing plates as shown schematically in FIG. 10(b).

The double tapered rollers are positioned and held by the holder rotatably in a specified configuration, and the layout and position will not be disturbed in any environments due to vibrations or the like, and the holding state is always maintained stably, and the rolling motion is smooth, and it is easy to carry or handle as single bearings, or incorporate into the device swivel unit.

When the compressor is stopped, the double tapered rollers are not always arranged neatly corresponding to the swivel motion of the compressor, but are arranged spontaneously as the operation of the compressor is started.

That is, while the compressor is stopped, the pressure in the compression chamber formed between the two scroll members is low, and there is almost no force for pressing the bearing plates in the thrust direction (axial load), and the double tapered rollers are set in a free direction in the state being held in the holder. As the compressor starts its operation, the pressure in the compression chamber is gradually increased, and the axial load acting on the bearing plates increases, and the double tapered rollers are tightly engaged with the tract surface of the bearing plates, and gradually follow up the scroll motion of the bearing plates, and are finally aligned in the direction corresponding to the swivel motion of the compressor, so that smooth scroll motion is realized.

When all double tapered rollers are aligned and the axial load is further increased, ultimately, the double tapered rollers make rolling motions only, thereby contributing to prevention of relative rotation of the both scroll members, together with the revolution preventive action by the revolution arrester.

Moreover, by installing the revolution arrester independently of the double tapered rollers, the double tapered rollers are responsible only for the intrinsic function of supporting the axial load from the both bearing plates, and it does not require the roller track surfaces for double tapered rollers for supporting the radial load (corresponding to pockets (h), (i) in FIG. 10 and FIG. 11), and therefore the number of disposed tapered rollers is increased, the bearing structure is simplified, and ease of manufacture is assured.

These and other related objects and features of the invention will be better understood from the following detailed description given in conjunction with the accompanying drawings, and the novel facts disclosed in the claims thereof.

DETAILED DESCRIPTION OF THE PREFERRED EMBODIMENTS

Referring now to the drawings, preferred embodiments of the invention are described below.

FIG. 1 through FIG. 9 show the scroll thrust bearings of the invention, and same reference numerals refer to same constituent members or elements throughout the drawings.

Embodiment 1

Figure 1A:
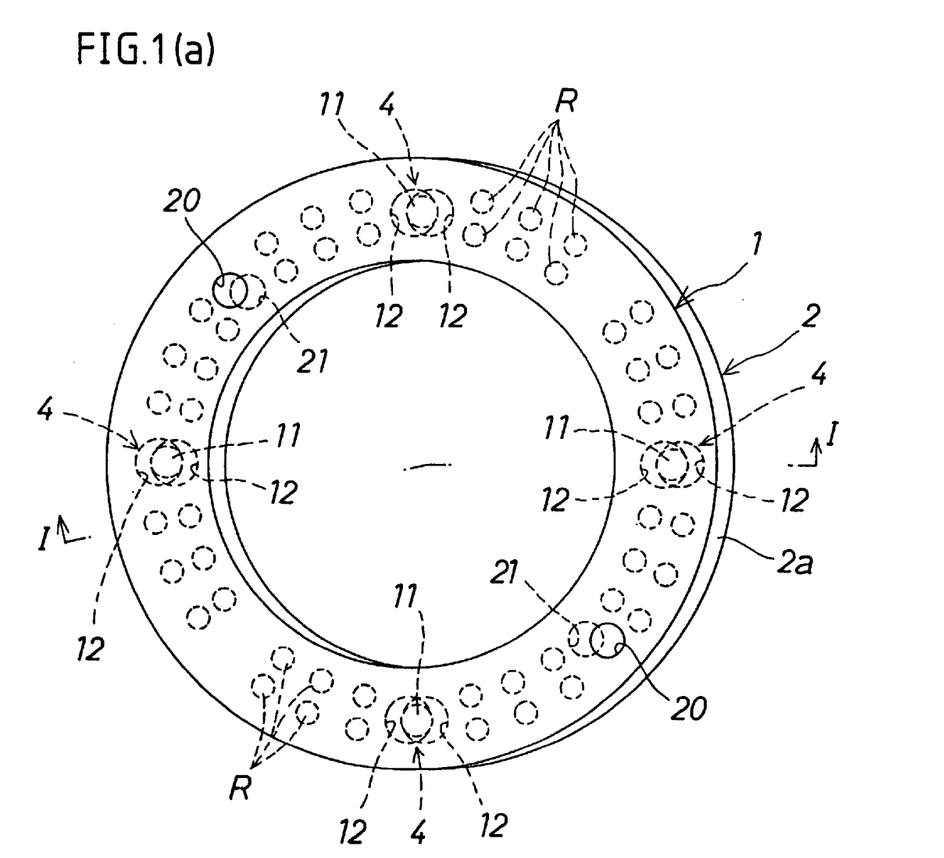
FIG. 1(a) is a plan view of a scroll thrust bearing in embodiment 1 of the invention.
Figure 1B:
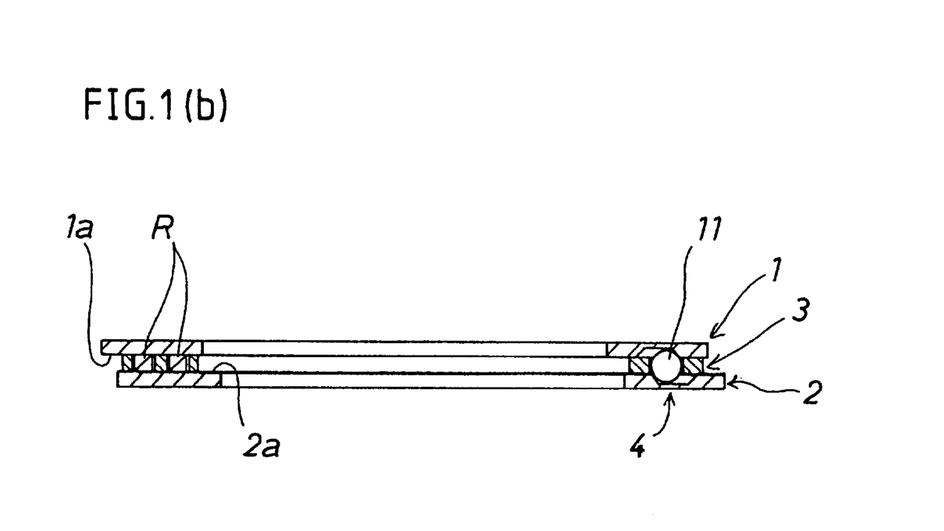
FIG. 1(b) is a sectional view along line I—I in FIG. 1(a) showing the scroll thrust bearing.
Figure 2:
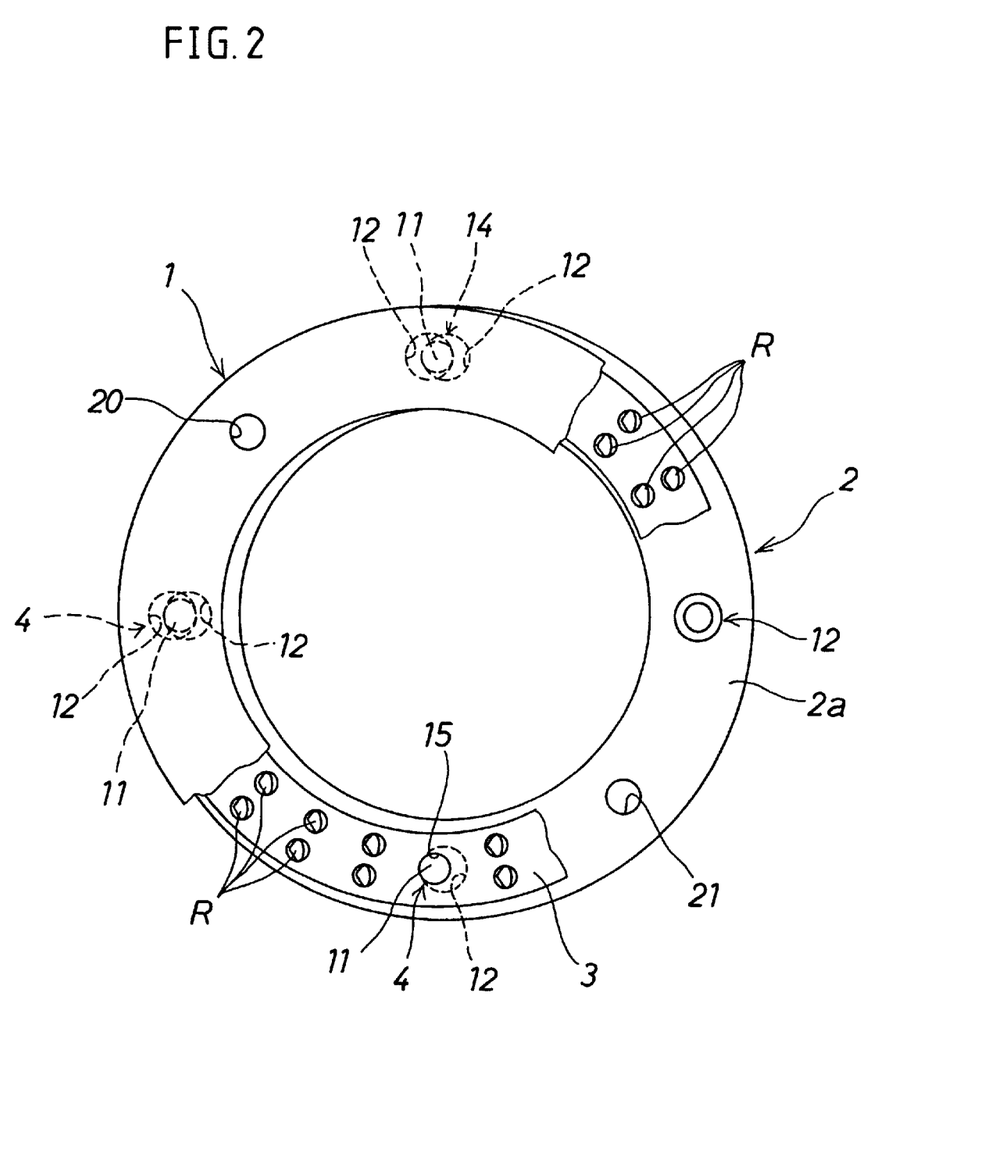
FIG. 2 is a partially cut-away plan view of the thrust bearing.
Figure 3:
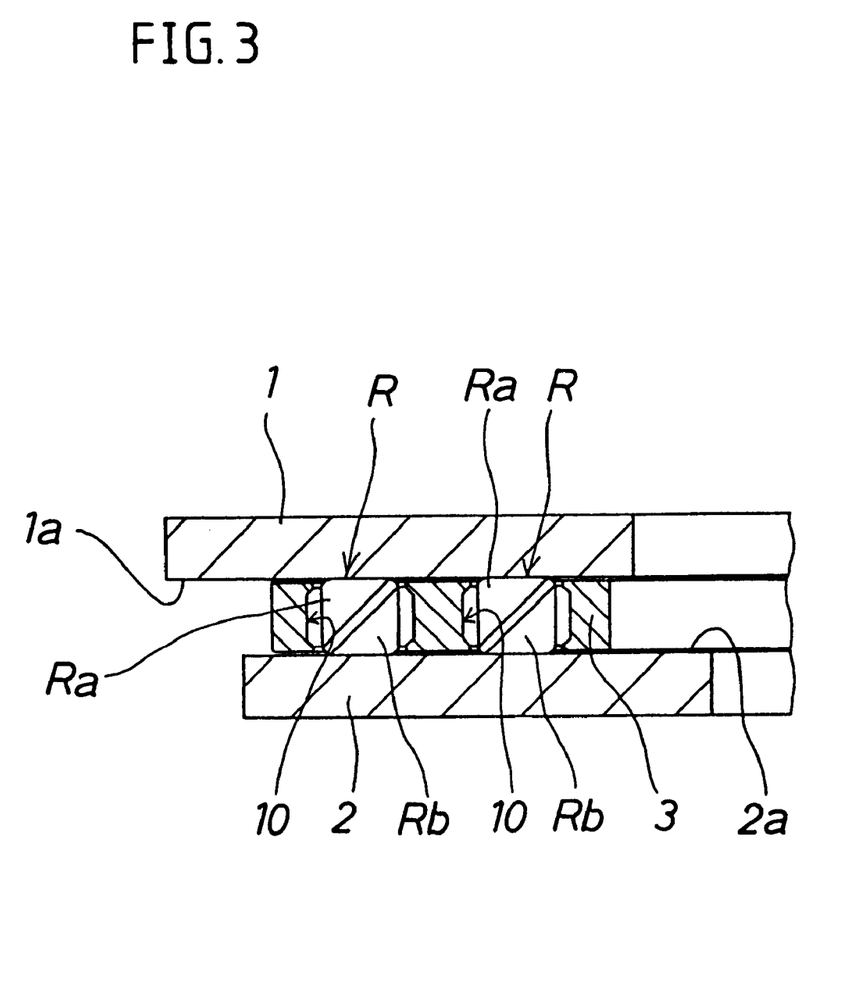
FIG. 3 is a magnified sectional view showing the structural relation of double tapered rollers, both bearing plates and holding plate of the thrust bearing.

A scroll thrust bearing of the invention is shown in FIG. 1 and FIG. 2. This scroll thrust bearing is specifically a thrust roller bearing preferably used as a axial load support structure in a scroll type compressor as shown, for example, in FIG. 10(a).

This thrust roller bearing comprises plural double tapered rollers R, R, . . . held by a holder 3 disposed so as to be free to swivel and roll between a pair of parallel bearing plates 1, 2, and a revolution arrester 4 for preventing relative rotation of both bearing plates 1, 2.

The upper and lower bearing plates 1, 2 are mutually in an identical structure, and are specifically in a form of track rings of flat annular form made of bearing steel, and their confronting inner sides 1a, 2a are flat track surfaces on which the double tapered rollers R, R, . . . swivel and roll.

The double tapered roller R is disposed so as to be capable of swiveling and rolling between the both bearing plates 1, 2, and supports the axial load from the both bearing plates 1, 2, and is made of bearing metal.

Figure 4A:
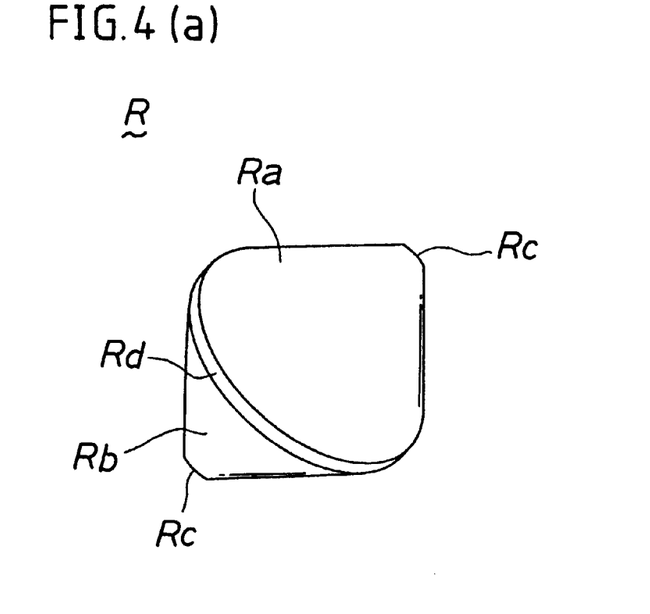
FIG. 4(a) is a perspective view of the double tapered roller.
Figure 4B:
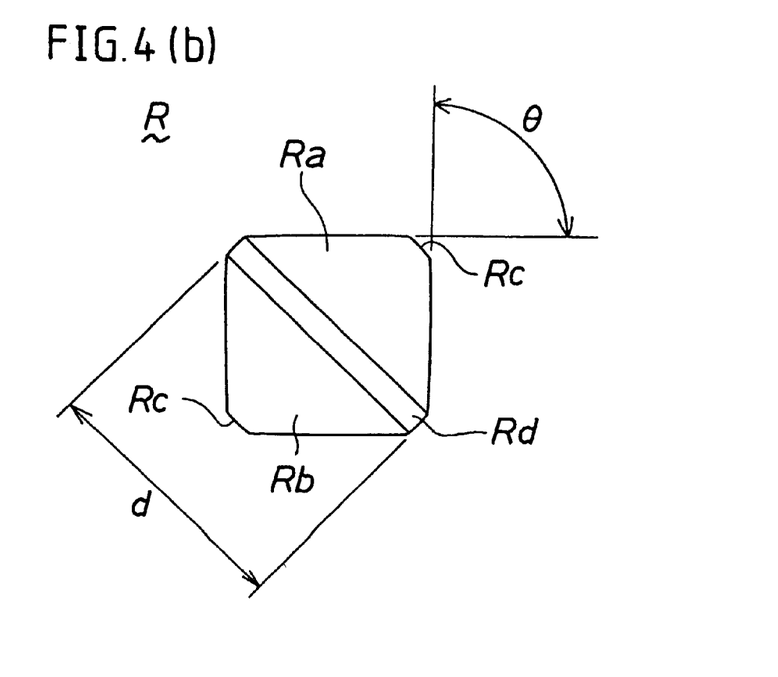
FIG. 4(b) is a front view of the double tapered roller.

The double tapered roller R comprises, as shown more specifically in FIG. 4, a pair of conical surfaces Ra, Rb, and the corners of the double tapered roller R, that is, the boundary portions Rc, Rd of the vertex of the double tapered roller R and both conical surfaces Ra, Rb are in spherical surfaces.

Both conical surfaces Ra, Rb of double tapered rollers R are polished and finished rolling surfaces, and the angle formed by both upper and lower vertices of the double tapered roller R, that is, the conical angle θ is 90 degrees, and therefore the intersecting angle θ of the both conical surfaces Ra, Rb is also set at 90 degrees. The generatrix length of the both conical surfaces Ra, Rb is set equal to the scroll radius in the scroll type compressor to be incorporated.

The double tapered roller R is rotatably held by the holder 3 between the both bearing plates 1, 2, and one conical surface Ra rolls on the track surface 1a of the bearing plate 1, and other conical surface Rb rolls on the track surface 2a of the bearing plate 2.

The holder 3 is for positioning and holding the double tapered rollers R, R, . . . so as to be rotatable with a specific configuration, and is more specifically formed as a flat annular holding plate corresponding to the bearing plates 1, 2.

This holding plate 3 is an integral molding of synthetic resin formed by injection molding, and holding pockets 10 for holding the double tapered rollers R are provided in plural positions of the holding plate 3 at specific intervals in the circumferential direction. More specifically, the holding pockets 10 are provided in plural positions at equal intervals in the circumferential direction of the holding plate 3 (in the illustrated example, 24 positions in one row, totaling to 48 positions), and hence this is a dual row configuration of a plurality (48) of double tapered rollers R, R, . . . arranged in two rows.

Figure 5A:
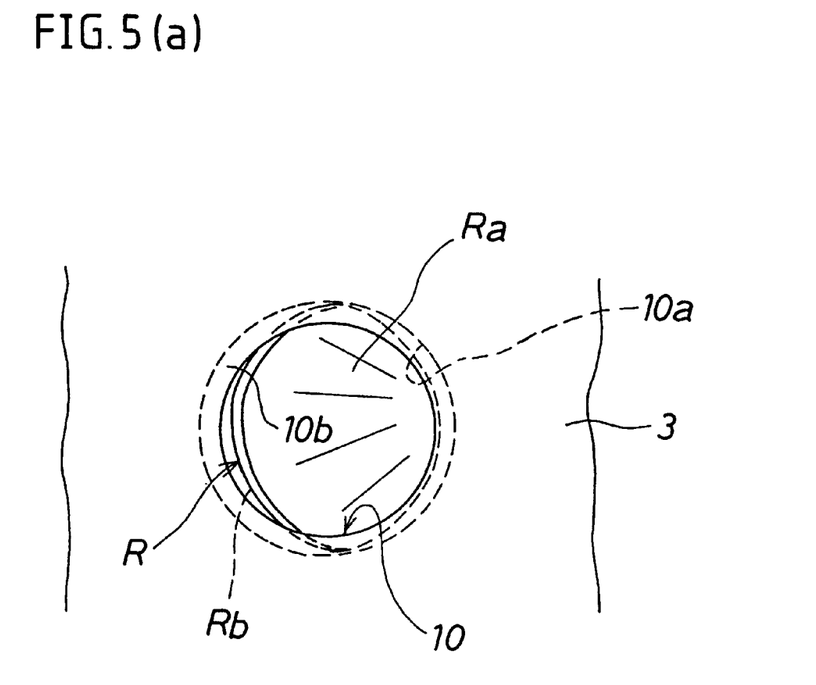
FIG. 5(a) is a magnified plan view of holder structure of the double tapered roller of the thrust bearing.
Figure 5B:
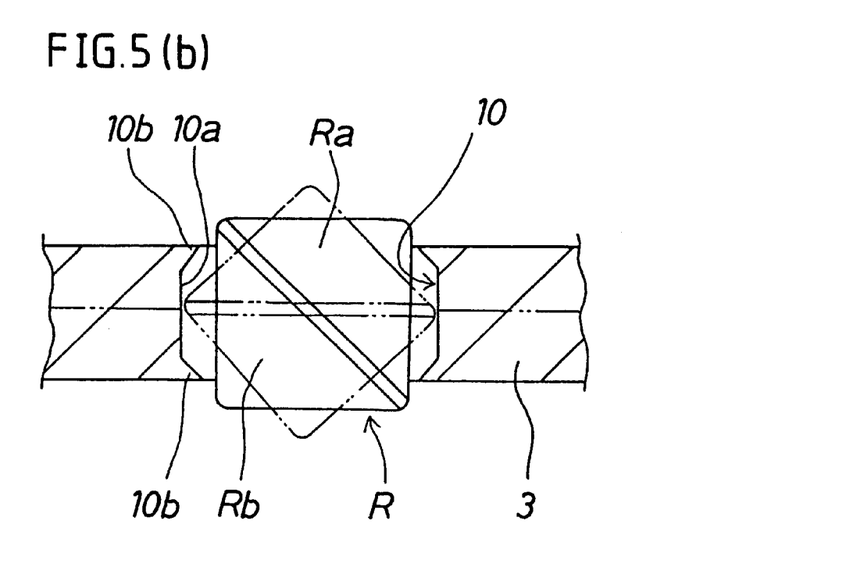
FIG. 5(b) is a magnified sectional view of the holder structure of the double tapered roller.

A specific structure of each holding pocket 10 is shown in FIG. 5, in which a pocket hole is formed to penetrate through to the upper and lower sides of the holding plate 3. This pocket hole 10 is a cylindrical surface 10a in its inside, having a uniform diameter slightly large than the maximum diameter (d) of the double tapered roller R (see FIG. 4), and its opening is an annular inward flange 10b having an inside diameter slightly smaller than the maximum diameter of the double tapered rollers R, R, . . . , so that the double tapered rollers R are held rotatably so as not to drop, and project oppositely to the upper and lower sides of the holding plate 3 (see FIG. 5(b)).

The number of double tapered rollers R to be disposed is determined in relation to the shape and dimension of the double tapered rollers R depending on the axial load to be supported.

The revolution arrester 4 is to prevent relative rotation of the both bearing plates 1, 2, and it is composed of a rolling ball 11 held on the holding plate 3, and a pair of ball track surfaces 12, 12 provided on both bearing plates 1, 2.

The rolling ball 11 is for supporting the moment load from the both bearing plates 1, 2, and is made of a spherical steel ball of bearing steel same as the double tapered roller R, and is rotatably held in a ball pocket 15 of the holding plate 3.

Figure 6A:
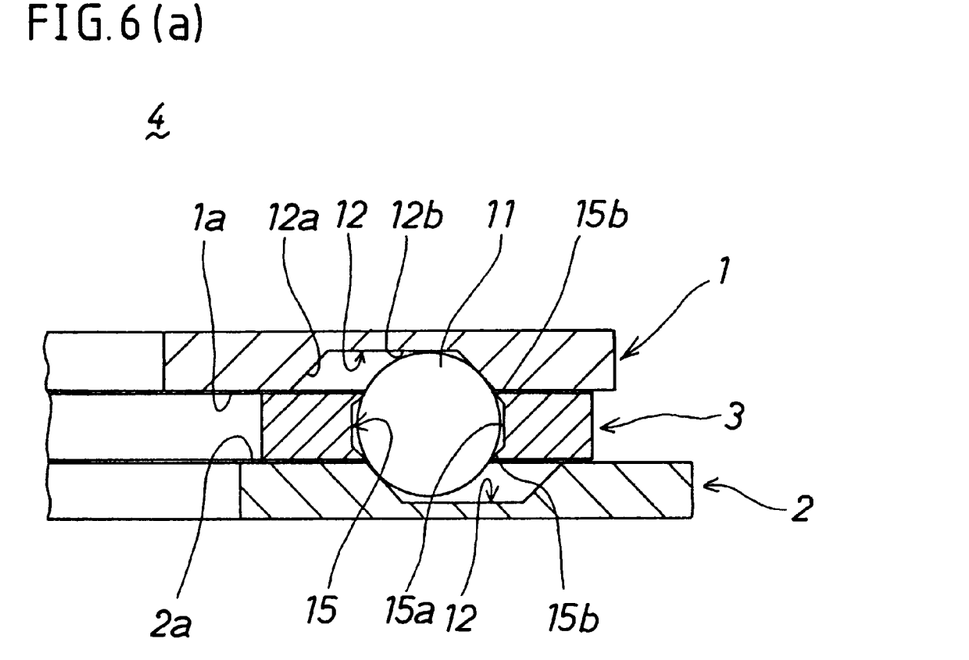
FIG. 6(a) is a sectional view of revolution arrester of the thrust bearing.
Figure 6B:
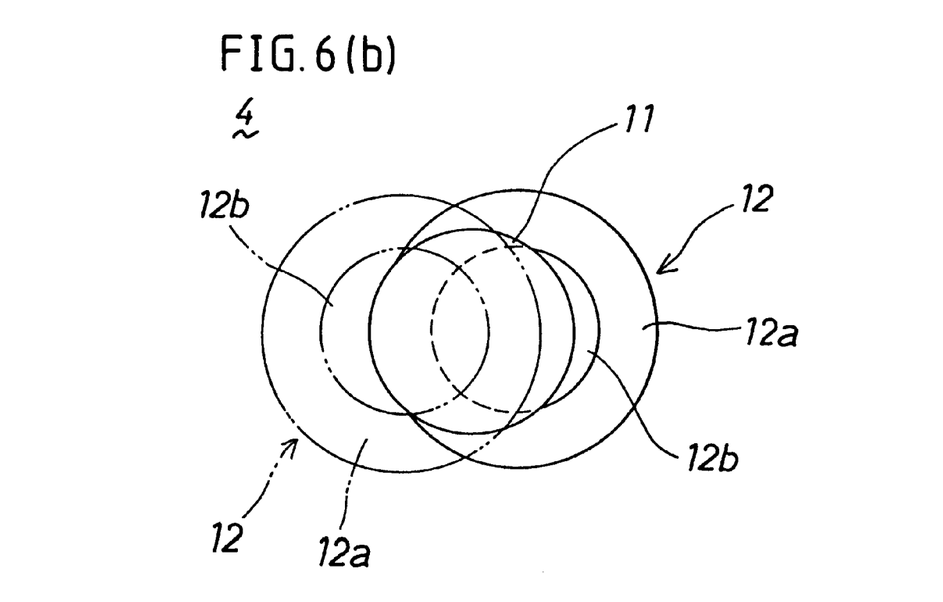
FIG. 6(b) is a plan view showing a part of the revolution arrester of the thrust bearing by a virtual line.

In the illustrated embodiment, the ball pockets 15 are provided in four positions at equal intervals in the circumferential direction of the holding plate 3, and as shown specifically in FIG. 6, same as the roller holding pocket 10, the pocket hole is formed by penetrating through the upper and lower sides of the holding plate 3. This pocket hole 15 is a cylindrical surface 15a in its inside, having a uniform diameter slightly large than the outside diameter of the rolling ball 11, and its opening is an annular inward flange 15b having an inside diameter slightly smaller than the outside diameter of the rolling ball 11, so that the rolling ball 11 is held rotatably so as not to drop, and projects oppositely to the upper and lower sides of the holding plate 3.

The pair of ball track surfaces 12, 12 are in a form of track pockets provided oppositely to the confronting sides of the both bearing plates 1, 2, and the rolling ball 11 held in the holding plate 3 is engaged so as to roll on the pair of track pockets 12, 12.

A specific structure of the track pocket 12 is a flat circular shape as shown in FIG. 6, in which an annular track surface 12a to be engaged with the rolling ball 11 is formed in its inside. This annular track surface 12a is tapered to as to spread wider toward the opening. The bottom 12b of the track pocket 12 is formed in a flat surface, and its depth is set in a size so as not to contact with the rolling ball 11 when assembling the bearing.

The pair of confronting track pockets 12, 12 are combined with both bearing plates 1, 2 so as to be positioned in an eccentric state by the portion of the radius (=generatrix length of conical surfaces Ra, Rb) of the swivel circle of the double tapered roller R (see the outer contour circle of planes (m), (n) in FIG. 10(b)).

Thus composed set of the rolling ball 11 and ball track surfaces 12, 12 is provided in plural positions (four positions in the illustrated example) at equal intervals in the circumferential direction, thereby constituting the revolution arrester 4.

The configuration of the rolling ball 11 and ball track surfaces 12, 12 is determined so as not to interfere with the swiveling and rolling motion of the double tapered rollers R, R, . . . , and so that a well-balanced rotation preventive function may be exhibited, and the number of sets being disposed is set depending on the moment load to be supported.

For example, in the illustrated embodiment, four sets of the rolling ball 11 and ball track surfaces 12, 12 are disposed uniformly, but when the moment load to be supported is small, three sets may be disposed uniformly, or if larger, five or six sets may be disposed uniformly, and the configuration is not limited to uniform layout alone as far as the balance is maintained. For effective exhibition of relative rotation preventive function of the both bearing plates 1, 2, it is desired that at least three sets of rolling ball 11 and ball track surfaces 12, 12 are disposed.

Thus constituted scroll thrust bearing is assembled as a axial load support structure in a scroll type compressor, for example, as shown in FIG. 10(a). In this case, for example, the upper bearing plate 1 is integrally fitted and fixed to the housing (a) as the fixed side bearing plate, and the lower bearing plate 2 is integrally fitted and fixed to the swivel scroll member (e) as the swivel side bearing plate.

In this relation, for the purpose of ease of incorporating job into the device swivel unit and prevention of deviation of mounting position, the bearing plates 1, 2 are provided with the positioning unit so as to be engaged with the fixed side or swivel side positioning unit of the device swivel unit to be assembled.

In the illustrated embodiment, as shown in FIG. 1(a), as positioning units of bearing plates 1,2, positioning holes 20, 21 are penetrating respectively. These positioning holes 20, 21 are, although not shown, inserted and engaged with positioning pins provided, for example, in the housing (a) and swivel scroll member (e). For this purpose, the positioning holes 20, 21 are provided in each pair at the confronting positions on a diameter line of the bearing plates 1, 2 each, and the configuration is set according to the positioning pins of the device swivel unit to be assembled.

In the state of inserting and engaging of the positioning holes 20, 21 and the positioning pins in the device swivel unit, the configuration of the thrust bearing is realized.

In the scroll thrust bearing thus integrally assembled into the scroll type compressor, when the swivel scroll member (e) is moved to swivel by the rotary drive source through the crankpin (g), the swivel scroll member (e) swivels or rotates on the fixed scroll member (c), without revolving by the action of the revolution arrester 4 (11, 12, 12), so that specified compression process is conducted.

In this compression process, the axial load acting on the bearing plate 2 is supported by the tapered rollers R, R, . . . disposed between the both bearing plates 1 and 2, and these tapered rollers R, R, . . . make rolling motions while their conical surfaces Ra, Rb are in linear contact state with the track surfaces 1a, 2a of the both bearing plates 1, 2 as schematically shown in FIG. 10(b).

As the mechanism of the rolling motion of the double tapered rollers R, R, . . . is specifically described, when the compressor is stopped, the double tapered rollers R, R, . . . are not always arranged neatly corresponding to the swivel motion of the compressor, but are spontaneously aligned when the operation of the compressor starts.

That is, while the compressor is stopped, the pressure in the compression chamber formed between the two scroll members (c) and (e) is low, and there is almost no force for pressing the bearing plates 1, 2 in the thrust direction (axial load), and the double tapered rollers R are set in a free direction in the state being held in the pocket hole 10 of the holding plate 3. As the compressor starts its operation, the pressure in the compression chamber is gradually increased, and the axial load acting on the bearing plates 1, 2 increases. As a result, the double tapered rollers R pressed in the vertical direction by the bearing plates 1, 2 are tightly engaged with the tract surfaces 1a, 2a, and gradually follow up the scroll motion of the bearing plates 1, 2, and are finally aligned (arranged neatly) in the direction corresponding to the swivel motion of the compressor, so that smooth scroll motion is realized.

When all double tapered rollers R. R, . . . are aligned and the axial load is further increased, ultimately, the double tapered rollers R, R, . . . make rolling motions only, thereby contributing to prevention of relative rotation of the both scroll members (c), (e), that is, revolution of the swivel scroll member (e), together with the revolution preventive action by the revolution arrester 4.

Thus, in this thrust bearing, by the revolution arrester 4, the pair of bearing plates 1, 2 are arrested of relative rotation, while relative and smooth swivel of the both bearing plates 1, 2 is assured by the rolling motion of the double tapered rollers R, R, . . . on the bearing plates 1, 2.

The double tapered rollers R, R, . . . are positioned and held by the holding plate 3 rotatably in a specified configuration, and the layout and position will not be disturbed in any environments due to vibrations or the like, and the holding state is always maintained stably, and the rolling motion is smooth, and it is easy to carry or handle as single bearings, or incorporate into the device swivel unit.

Moreover, by installing the revolution arrester 4 independently of the double tapered rollers R, R, . . . , the double tapered rollers R, R, . . . are responsible only for the function of supporting the axial load from the both bearing plates 1, 2. Therefore, the both bearing plates 1, 2 do not require the roller track surfaces for double tapered rollers R, R, . . . (corresponding to pockets (h), (i) in FIG. 10 and FIG. 11), and the number of disposed tapered rollers R, R, . . . is increased, the bearing structure is simplified, and ease of manufacture is assured.

Embodiment 2

Figure 7A:
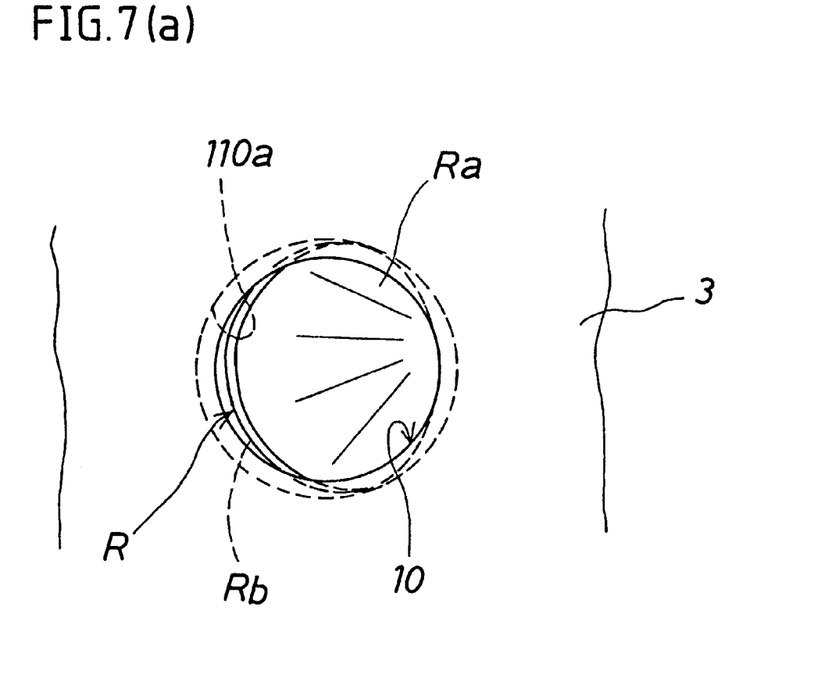
FIG. 7(a) is a magnified plan view showing the holder structure of double tapered roller of a scroll thrust bearing in embodiment 2 of the invention.
Figure 7B:
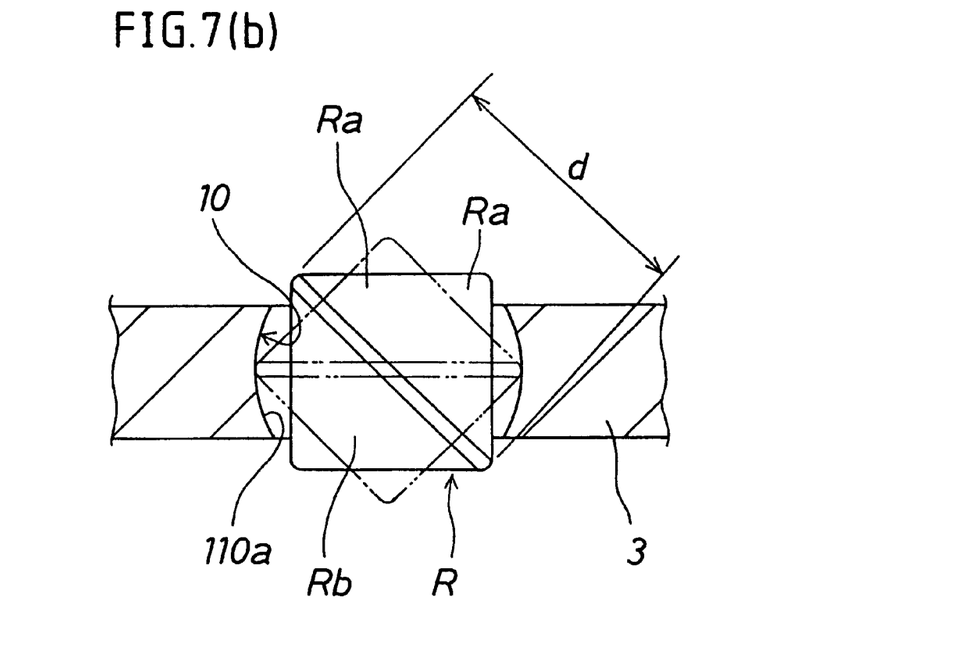
FIG. 7(b) is a magnified sectional view of the holder structure of the double tapered roller.

This embodiment is shown in FIG. 7, in which the specific structure of the holding pocket 10 for holding the double tapered rollers R is modified.

That is, the roller holding pocket 10 of the embodiment is formed as a pocket hole penetrating to the upper and lower sides of the holding plate 3 as shown in FIG. 7, same as in embodiment 1, but its inside is a holding space of a spherical surface 110a having a slightly larger diameter than the maximum diameter (d) of the double tapered roller The other constitution and action is same as in embodiment 1.

Embodiment 4

Figure 9A:
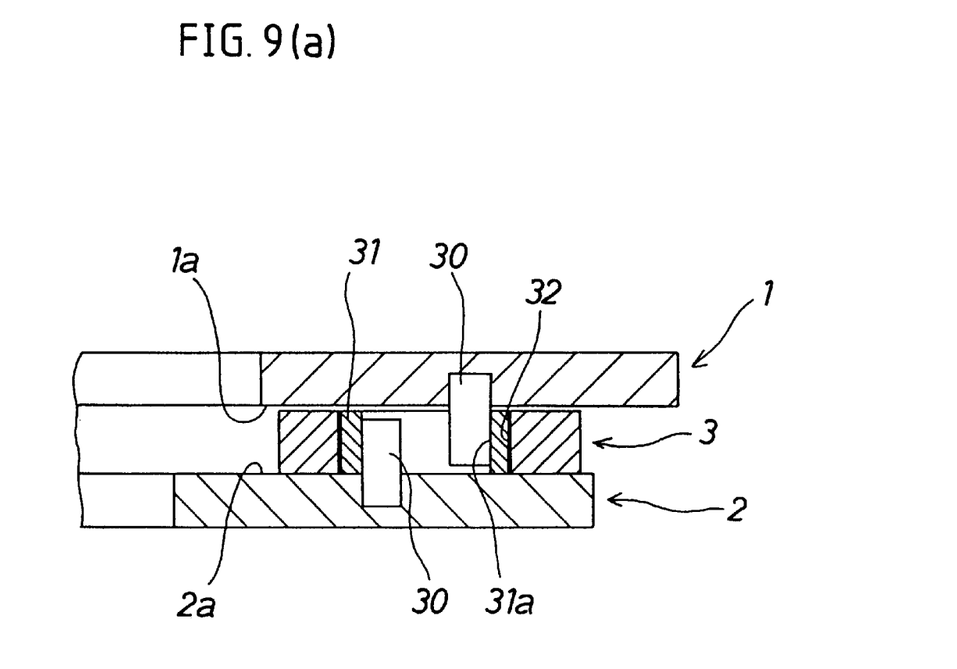
FIG. 9(a) is a sectional view showing the revolution arrester of a scroll thrust bearing in embodiment 4 of the invention.
Figure 9B:
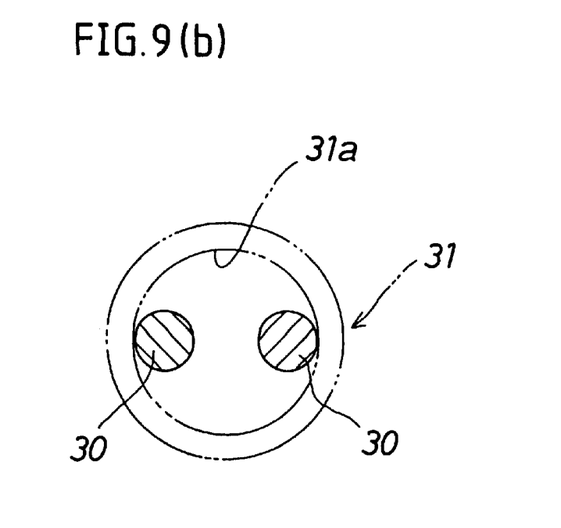
FIG. 9(b) is a plan view showing a part of the revolution arrester by a virtual line.

This embodiment is shown in FIG. 9, in which, same as in embodiment 3, the specific structure of the revolution arrester 4 is modified.

That is, the revolution arrester 4 of the embodiment comprises a pair of swivel pins 30, 30 provided in both bearing plates 1, 2, and a swivel hole 31a penetrating through the holding plate 3.

The swivel pins 30, 30 are upright columnar bars fixed parallel opposite to the both bearing plates 1, 2. This confronting pair of swivel pins 30, 30 are combined with the both bearing plates 1, 2 so as to be positioned in an eccentric state by the portion of the radius (=generatrix length of conical surfaces Ra, Rb) of the swivel circle of the double tapered roller R (see the outer contour circle of planes (m), (n) in FIG. 10(b)).

The swivel hole 31a is specifically formed by a cylindrical ring. That is, a cylindrical hole is penetrating through the holding plate 3, and a cylindrical ring 31 is held in this cylindrical hole, and the inner surface of this cylindrical ring 31 forms the swivel hole 31a.

The cylindrical ring 31 is a metal piece for preventing R.

The other constitution and action is same as in embodiment 1.

Embodiment 3

Figure 8A:
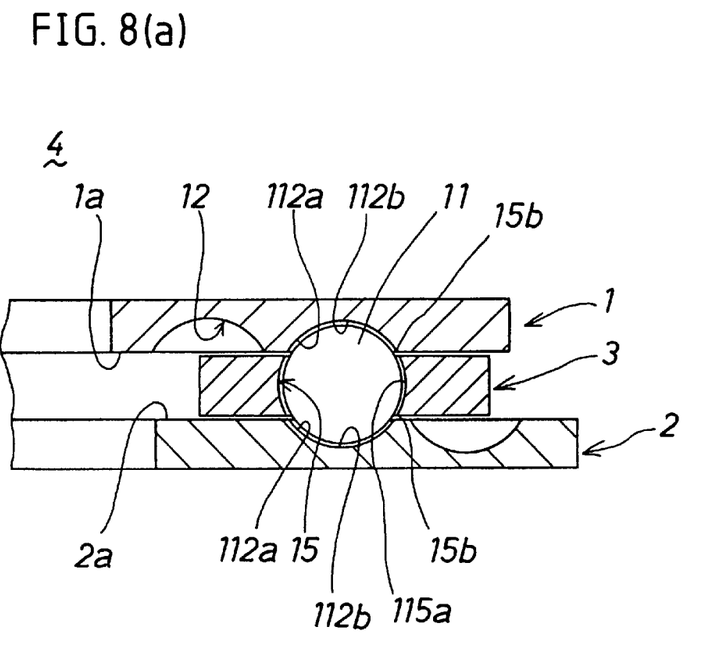
FIG. 8(a) is a sectional view showing the revolution arrester of a scroll thrust bearing in embodiment 3 of the invention.
Figure 8B:
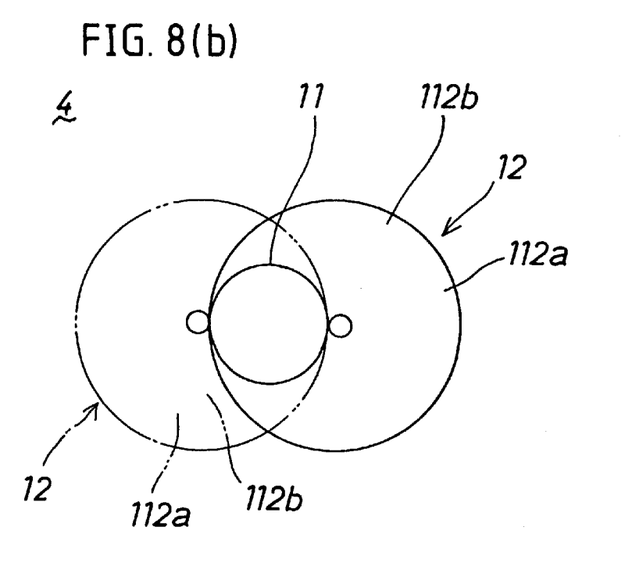
FIG. 8(b) is a plan view showing a part of the revolution arrester of the thrust bearing by a virtual line.

This embodiment is shown in FIG. 8, in which the specific structure of the revolution arrester 4 is modified.

That is, in the revolution arrester 4 of the embodiment, the ball pocket 15 of the holding plate 3 has, same as the roller holding pocket 10 in embodiment 2, a spherical surface 115a slightly larger in diameter than the outside diameter of the rolling ball 11 in its inside, slidably holds the outer circumference of the rolling ball 11.

The ball track surfaces 12, 12 provided in both bearing plates 1, 2 are formed in annular grooves in which the rolling ball 11 rolls and runs, and the sectional shape is an arc section having a curvature corresponding to the curvature of the outer circumference of the rolling ball 11 (see FIG. 8(a)). As a result, the annular track surface engaged with the rolling ball 11, that is, the outer circumference 112a of the ball track surface 12 is a concave arc surface nearly coinciding with the outer circumference of the rolling ball 11. It is also same as in embodiment 1 that the bottom 112b of the ball track surface 12 is set at a depth so as not to contact with the rolling ball 11. wear or seizure due to direct sliding of the swivel pins 30, 30 and the cylindrical hole of the holding plate 3, and is slidably provided in the cylindrical hole of the holding plate 3. The confronting pair of the swivel pins 30, 30 of the both bearing plates 1, 2 are slidably engaged with the inner surface 31a of the cylindrical ring 31.

As the pair of swivel pins 30, 30 slide and are guided on the inner surface 31a, the both bearing plates 1, 2 relatively swivel and move in the same track as the swivel circle of the double tapered roller R.

The other constitution and action is same as in embodiment 1.

The foregoing embodiments 1 to 4 are only preferred embodiments of the invention, and may be modified, for example, as follows.

(1) In the illustrated embodiments, the holding plate 3 is an integral molding of synthetic resin, but it may be also made of metal, and in such a case, as indicated by double dot chain line in FIG. 5(b), by laminating and fixing two metal plates, the pocket hole 10 and ball pocket 15 may be formed easily.

(2) The specific shape and dimension such as vertex angle of the conical surfaces Ra, Rb of the double tapered roller R may be appropriately designed or changed in consideration of the relation between the swivel radius of the conical surfaces Ra, Rb and the diameter of the double tapered roller R, depending on the swivel radius of the device swivel unit in which the thrust roller bearing is assembled, for example, the scroll swivel unit in the scroll type compressor.

For example, the illustrated embodiment has a sectional shape of a rectangular equilateral triangle with the vertex angle of 90 degrees, but double tapered rollers of various shapes and dimensions as disclosed, for instance, in Japanese Laid-open Patent No. 62-274113 may be employed.

(3) In the illustrated embodiments, for the ease of assembly into the device swivel unit, the positioning parts are formed as positioning holes 20, 21, but the specific form is determined depending on the form of the positioning unit of the device swivel unit at the mating side, and it may be changed to an opposite form of the illustrated embodiment or other form having similar function.

(4) In the illustrated embodiments, the double tapered rollers R, R, . . . are arranged in two rows in the radial direction to form dual row configuration, but the inner and outer rows of double tapered rollers R, R, . . . may be arranged in zigzag form, or if the axial load to be supported is small, the double tapered rollers R, R, . . . may be formed in one row at specific intervals in the circumferential direction to form single row configuration.

As described herein, according to the scroll thrust bearing of the invention which comprises a fixed side bearing plate disposed at the fixed side, a swivel side bearing plate disposed at the swivel side, plural double tapered rollers disposed so as to roll between the two bearing plates for supporting the axial load from both bearing plates, a holder for positioning and holding these double tapered rollers rotatably in a specific configuration, and a revolution arrester for preventing relative rotation of the both bearing plates, the following effects are obtained, and an inexpensive and precise structure is presented.

(1) By the revolution arrester, while relative rotation of a pair of bearing plates is prevented, relative and smooth swivel is assured by the rolling motion of the double tapered roller on the fixed side bearing plate.

(2) The double tapered roller is positioned and held rotatably with a specific configuration by means of a holder, and the configuration is not disturbed in any environments due to vibrations or the like, and the holding state is always maintained stably, and the rolling motion is smooth, and it is easy to carry or handle as single bearings, or incorporate into the device swivel unit.

(3) Since the revolution arrester is provided independently of the double tapered roller, the doubled tapered roller is responsible only for the function of supporting the axial load from the both bearing plates, and roller ball track surface for double tapered roller is not necessary, and the load capacity is increased due to increase in the number of tapered rollers disposed, the number of parts is decreased by simplifying the bearing structure, the assembling processes are decreased, the manufacture is easy, the machining precision is enhanced, and the manufacturing cost and product cost are reduced.

That is, the double tapered rollers are relatively large in the number of pieces disposed for the intrinsic function of support of axial load, and the conventional bearing structure of this kind has no revolution arresting function, and the pocket structure for supporting the moment load from the both bearing plates is not necessary, and the roller track surfaces may be flat planes. Accordingly, the interval of the adjacent double tapered rollers may be set narrower as compared with the structure having pocket structure in the both bearing plates (since there is no interference in action between the adjacent double tapered rollers), and therefore the number of double tapered rollers to be disposed may be increased. The roller holding pocket of the holder may be only required to have a function of holding the scroll motion of the double tapered rollers, and the dimensional precision or positional precision is not required to be so high.

(4) The pair of bearing plates are provided with positioning units to be engaged with the fixed side or swivel side positioning unit of the device swivel unit to be incorporated, and together with the ease of handling as the single bearings, it is easy and secure to incorporate into the device swivel unit, and the both bearing plates are free from deviation during rolling motion, and occurrence of abnormal load is effectively prevented.

As the invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A scroll thrust bearing interposed between parts making relative scroll motions, comprising:

a fixed side bearing plate disposed at the fixed side, a swivel side bearing plate disposed at the swivel side, plural double tapered rollers disposed so as to roll between the two bearing plates for supporting the axial load from both bearing plates, a holder for positioning and holding these double tapered rollers rotatably in a specific configuration, and a revolution arrester for preventing relative rotation of said both bearing plates.

2. A scroll thrust bearing of claim 1, wherein said both bearing plates are formed as flat annular track rings, and confronting flat planes of the both track rings are track surfaces on which said double tapered rollers swivel and roll, said holder is in a form of a holding plate of a flat annular form corresponding to the bearing plates, this holding plate is provided with roller holding pockets for rotatably holding said double tapered rollers at specific intervals in the circumferential direction, and said double tapered rollers rotatably held in the roller holding pockets of this holding plate have one conical surface rolling on the track surface of one bearing plate, and other conical surface rolling on the track surface of the other bearing plate.

3. A scroll thrust bearing of claim 2, wherein the roller holding pockets of said holding plate are formed as pocket holes penetrating into both sides of the holding plate, and the pocket holes form a holding space having an inside diameter slightly larger than the maximum diameter of said double tapered rollers in the inside, and form circular holes slightly smaller than the maximum diameter of said double tapered rollers in the opening.

4. A scroll thrust bearing of claim 3, wherein said pocket holes form cylindrical surfaces having a uniform diameter slightly larger than the maximum diameter of said double tapered rollers in the inside, and form annular inward flanges having an inside diameter slightly smaller than the maximum diameter of said double tapered rollers in the opening.

5. A scroll thrust bearing of claim 3, wherein said pocket holes have spherical surfaces having a diameter slightly larger than the maximum diameter of said double tapered rollers in the inside.

6. A scroll thrust bearing of claim 2, wherein said holding plate is an integral molding of synthetic resin formed by injection molding.

7. A scroll thrust bearing of claim 1, wherein said revolution arrester comprises a rolling ball rotatably held in the ball pocket of said holder, and a pair of ball track surfaces provided oppositely to the confronting sides of said both bearing plates, this confronting pair of ball track surfaces have annular ball track surfaces engaged with the rolling ball to roll thereon, and the rolling ball rolls and runs on the pair of ball track surfaces, so that the both bearing plates swivel and move relatively in the same track as the swivel circle of the double tapered rollers.

8. A scroll thrust bearing of claim 7, wherein there are at least three sets of the rolling ball and pair of ball track surfaces, so that relative rotation of the both bearing plates is prevented.

9. A scroll thrust bearing of claim 7, wherein said holder is in a form of a flat annular holding plate corresponding to said bearing plates, said ball pocket is in a form of pocket hole penetrating to the upper and lower sides of said holding plate, and this pocket hole forms a cylindrical surface having a uniform diameter slightly larger than the outside diameter of the rolling ball in the inside, and forms an annular inward flange having an inside diameter slightly smaller than the outside diameter of the rolling ball in the opening.

10. A scroll thrust bearing of claim 7, wherein said holder is in a form of a flat annular holding plate corresponding to said bearing plates, said ball pocket is in a form of pocket hole penetrating to the upper and lower sides of said holding plate, and this pocket hole forms a spherical surface having a diameter slightly larger than the outside diameter of the rolling ball in the inside.

11. A scroll thrust bearing of claim 7, wherein said pair of ball track surfaces form track pockets having a flat circular shape provided oppositely to each other on the confronting sides of said both bearing plates, and the rolling ball held in said holder is engaged with the annular track surfaces of the pair of track pockets so as to roll thereon.

12. A scroll thrust bearing of claim 11, wherein said track pockets form taper surfaces spreading widely toward the opening in the annular track surface formed inside, and the bottom is formed as a flat surface set in a depth dimension so as not to contact with the rolling ball when assembling the bearing.

13. A scroll thrust bearing of claim 7, wherein said pair of ball track surfaces are formed as annular grooves in which the rolling ball rolls and runs, the sectional shape is an arc section having a curvature corresponding to the curvature of the outer circumference of the rolling ball.

14. A scroll thrust bearing of claim 1, wherein said revolution arrester comprises a pair of swivel pins fixed oppositely to said both bearing plates, and a swivel hole penetrating through said holder, this swivel hole has a cylindrical inner surface to be slidably engaged with the pair of confronting swivel pins, and said pair of swivel pins slide and are guided on the cylindrical inner surface, so that said both bearing plates swivel and move relatively with the same track as the swivel circuit of said double tapered rollers.

15. A scroll thrust bearing of claim 1, wherein there are at least three sets of said pair of swivel pins and swivel hole, and relative rotation of said both bearing plates is prevented.

16. A scroll thrust bearing of claim 14, wherein said holder is formed as a holding plate of a flat annular form corresponding to said bearing plates, a cylindrical ring is slidably held in the cylindrical hole penetrating in this holding plate, and said swivel hole is formed, and said pair of swivel pins are formed as upright columnar bars fixed parallel oppositely to said both bearing plates, and are slidably engaged with the cylindrical inner surface of said swivel hole.

17. A scroll thrust bearing of claim 1, wherein said pair of bearing plates have positioning units to be engaged with the fixed side or swivel side positioning unit of the device to be assembled in.

18. A scroll thrust bearing of claim 1, wherein double tapered rollers are arranged in a row between said both bearing plates at specific intervals in the circumferential direction.

19. A scroll thrust bearing of claim 1, wherein double tapered rollers are arranged in two rows between said both bearing plates at specific intervals in the circumferential direction.

20. A scroll thrust bearing of claim 1, wherein it is used as the thrust bearing in a scroll type compressor.

* * * * *